Jan. 6, 1925.
C. M. BAILEY ET AL
DIRECTION SIGNAL
Filed Sept. 18, 1923
1,522,042
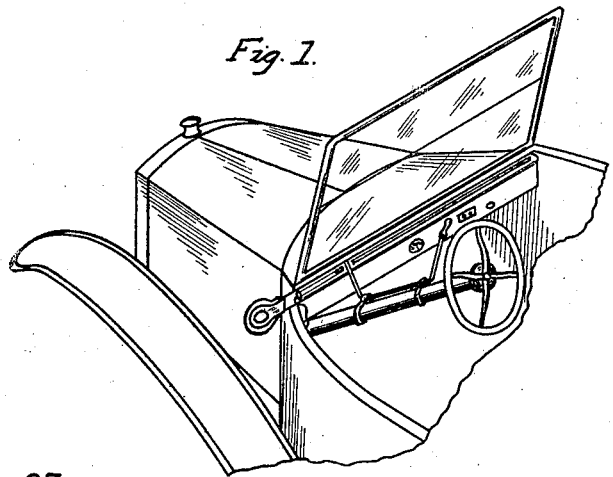
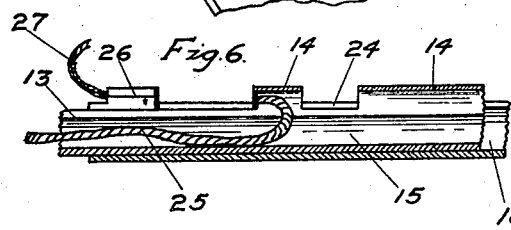
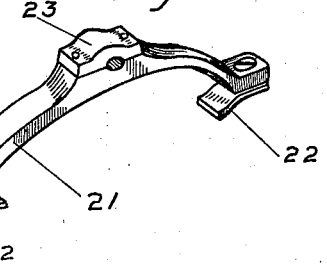
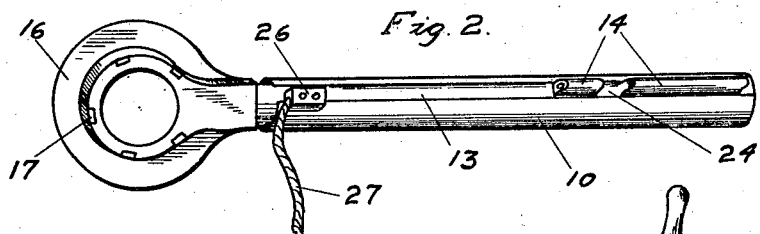
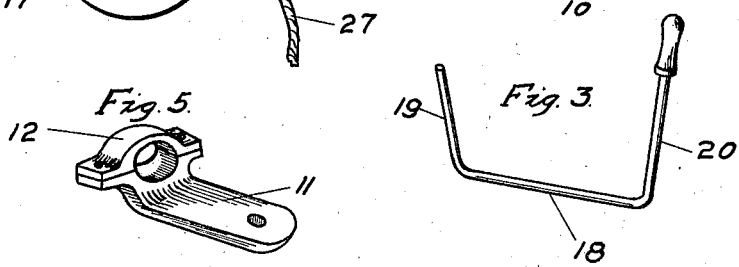
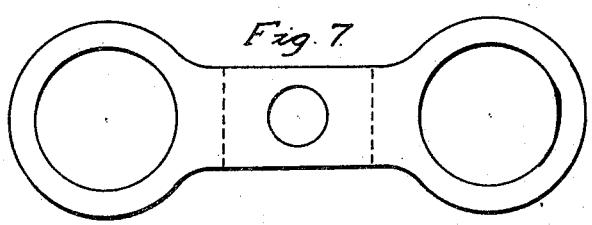
C. M. BAILEY.
L. WESTGATE. INVENTOR.
BY
ATTORNEY Patented Jan. 6, 1925.

1,522,042

UNITED STATES PATENT OFFICE.

CHARLES M. BAILEY AND LEANDER WESTGATE, OF LINCOLN, NEBRASKA.

DIRECTION SIGNAL.

Application filed September 13, 1923. Serial No. 663,391.

*To all whom it may concern:*

Be it known that we, CHARLES M. BAILEY and LEANDER WESTGATE, citizens of the United States, residing at Lincoln, in the county of Lancaster and State of Nebraska, have invented certain new and useful Improvements in Direction Signals, of which the following is a specification.

Our invention relates to direction signals designed for use on automobiles, whereby the driver of an automobile is enabled to signal to others his intentions regarding direction of travel.

We are aware that numerous signals of the kind have been patented, and we are also aware that a few of these signals have been placed on the market, but so far as we are aware, all of these signals have been failures commercially, and in designing our signal our object has been to design a signal of an entirely new type and which would be free from any or all of the objections made to prior signals of the kind. The most common objections are that the signals are too costly, that they are too complicated, that they are too liable to get out of order, or that their range of usefulness is too limited. The object of our invention is the provision of a direction signal which will be free from all of these objections as well as from numerous minor objections frequently made by prospective purchasers.

Having in view this object and others which will be pointed out in the description, we will now refer to the drawings which are part of our application, and in which like numerals refer to like parts in the description. In the drawings—

Figure 1 is a view in perspective of the front portion of an automobile with our direction signal in place.

Figure 2 is a plan view of the signal, signal arm, and sheath for the signal arm.

Figure 3 is a view of the controlling lever for the signal.

Figure 4 is a view of one of the clamps which we employ for mounting the controlling lever on the steering post of the automobile.

Figure 5 illustrates one of the clamps whereby we secure the sheath for our signal arm in position in front of the driver's seat.

Figure 6 is a sectional view of a portion of the signal arm and sheath, showing particularly the contact points for the lighting circuit.

Figure 7 is a plan view of the blank out of which we form the shield and windows at the outer end of our signal arm.

The device herein described and claimed is in the nature of an improvement on the signal device of our prior application, Serial Number 636732, filed May 4, 1923.

The sheath or support 10 for the signal arm is designed for attachment to an automobile. In general, the most convenient position for the support 10 is the instrument board of the automobile, where the signal will be directly in front of the driver. For thus securing the support 10 we provide clamps as shown in Figure 5. Each clamp consists of two parts 11 and 12 with screw connections for releasably securing them together. The part 11 is provided with one or more apertures whereby it may be secured to the instrument board by means of screws or bolts. The support 10 is clamped between the parts 11 and 12. We prefer to use two of these clamps, one at each end of the support 10, with the parts 11 projecting inwardly. It should be here noted that the length of the support 10 is governed largely by the type of car on which the signal is to be installed, and our clamping means is admirably adapted for such variation. If the support 10 is wider than the instrument board, or if its length interferes with the instruments, it is only necessary to cut the support 10 down to the proper length and to shift the clamp.

The support 10 is provided with a slit 13, in which the tongue 14 of the signal arm is adapted to slide. The signal arm 15 is so designed that it slides freely but snugly in its support 10, with the tongue 14 sliding in the groove 13. The outer extremity of the signal arm 15 is provided with the usual bulb socket (not shown) and with a guard or shield 16 for protecting the bulb and for serving as a day signal. The bulb is further protected at the front and rear by means of the shield formed out of the blank shown in Figure 7. This blank has a central aperture for the reception of the end of the signal arm 15, and is bent along the two dotted lines shown in the figure. The overlapping portions of the blank are provided with apertures, these apertures serving as windows for the bulb. It is our plan to provide the aperture at the rear with a red window to serve as a stop signal and to cover the aperture at the front with a green window to serve as a parking signal, but it is understood that we may vary these colors as desired. The windows may be made out of glass, celluloid, or any other suitable material. The edges of the overlapping portions of the blank are secured by means of clips 17, so that when it becomes necessary remove a bulb or to insert a new one, the clips 17 on one side may be released so that the window on that side may be opened to give access to the bulb socket.

For actuating the signal arm, we provide the lever shown in Figure 3 and we mount this lever as shown in Figure 1. The lever has an intermediate portion 18 with two arms 19 and 20 projecting therefrom in different planes. The arm 20 is provided at its extremity with a handle of any suitable form. The intermediate portion 18 is secured to the steering post by means of the clamps shown in Figure 4. Each of these clamps consists of a bowed part 21 having the general contour of the upper side of the steering post. At the extremities of the bowed part are clips 22 which are adapted to engage the under side of the steering post. A cap 23 is secured centrally to the bowed part 21, there being an opening between the parts 21 and 23. This opening is adapted to receive the intermediate portion 18 of the lever, the lever being pivoted in the clamps.

As shown in Figure 1, the device is so mounted that the handle end of the arm 20 is in close proximity to the rim of the steering wheel, while the arm 19 is in contact with the tongue 14. The tongue 14 has a cut away portion as at 24 to receive the extremity of the arm 19. It will readily be seen that a slight movement of the arm 20 on its pivot will cause the arm 19 to move through a similar arc to move the signal arm either in or out.

As thus far described, our signal is useful only by day, and in order to adapt it for night use we have connected it as shown with the lighting system of the automobile. The conductor 25 lies within the tubular signal arm 15 and extends from the bulb socket to the inner surface of the outer extremity of the tongue 14. A metallic abutment 26 is secured to the support 10 at its outer extremity, and a conductor 27 connects the abutment 26 with the lighting system of the car. The abutment 26 is of course insulated from the support 10. It follows that the abutment 26 will serve not only as a stop to limit the outward movement of the signal arm 15 but serves as a means for closing the circuit of the signal light. The signal light flashes on only when the signal arm is in its fully projected position, and remains on until the contact is broken at the beginning of the retraction of the signal arm.

From the foregoing description it will be seen that we have provided a signal and actuating mechanism of extreme simplicity. The device can be manufactured and sold at an exceedingly low cost. The parts are so few in number and so simple in construction that it is practically impossible for them to get out of order. Owing to the simplicity in design and the almost complete absence of wearing parts, our signal device will outlast any car on which it is installed. The position of the actuating lever near the rim of the steering wheel makes the operation as simple and easy as the operation of the spark and throttle levers, and the driver can throw the lever without taking his hand from the steering wheel or his eyes from the road ahead.

Having thus described our invention in terms which will be readily understood by others skilled in the art to which it pertains, what we believe to be new and desire to secure by Letters Patent of the United States is:—

1. Operating means for a vehicle signal, comprising a rock shaft, a pair of arcuate brackets shaped to the configuration of the side of a steering column, clips adjustably mounted on the ends of the brackets and adapted to be clamped against the opposite side of the steering column for binding the brackets adjustably thereon, said arcuate brackets each comprising two separable parts having a bearing therebetween for supporting said rock shaft, a radial arm on said rock shaft, a radial handle on the rock shaft, said brackets and said radial arm being adapted to be adjusted to connect the radial arm with a signal and position said handle for easy access of the vehicle operator to actuate the signal.

2. Operating means for a vehicle signal, comprising a U-shaped member producing an intermediate rock shaft and a radial arm at one end and a radial handle at its other end, a pair of arcuate brackets having bearings therein engaging said rock shaft and adapted to fit against one side of a steering column, and clips adjustably mounted on opposite ends of the arcuate brackets and adapted to be tightened for binding engagement against the opposite side of the steering column to hold the brackets in adjusted position, said brackets being adjustable on the steering column to connect the radial arm with a signal to be operated.

In testimony whereof we affix our signatures.

CHARLES M. BAILEY.
LEANDER WESTGATE.